3,022,313
ORGANIC COMPOUNDS

Jacob Szmuszkovicz, Portage Township, Kalamazoo County, and William C. Anthony, Kalamazoo, Mich., assignors to The Upjohn Company, Kalamazoo, Mich., a corporation of Delaware
No Drawing. Filed May 11, 1960, Ser. No. 28,193
9 Claims. (Cl. 260—319)

The present invention relates to novel organic compounds and more particularly relates to 2-skatyl-1,3-propanediols.

The novel 2-skatyl-1,3-propanediols of the present invention can be represented by the following formula:

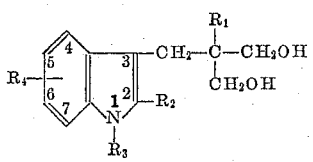

wherein $R_1$, $R_2$, and $R_3$ represent hydrogen and alkyl containing 1 to 4 carbon atoms, inclusive, e.g., methyl, ethyl, propyl, isopropyl, butyl, isobutyl, and the like. $R_4$ represents hydrogen, hydroxy, benzyloxy, and alkoxy containing 1 to 4 carbon atoms, inclusive, e.g., methoxy, ethoxy, propoxy, isopropoxy, butoxy, and the like.

The novel compounds of the invention show valuable pharmacological activities in mammals and animals of economic value. Illustratively, the novel compounds of the invention possess activity as central nervous system depressants. For example, the compounds exhibit hypnotic, anticonvulsant, tranquillizing, and drug potentiating activity useful in prolonging the effect of sedatives and hypnotics in laboratory animals such as rats, mice, and the like. The novel compounds are also useful in depressing motor activity in such animals.

In addition, the compounds of the invention exhibit high absorption of radiation in the wavelength range of 280–300 millimicrons and accordingly can be employed as effective sun screens when incorporated in suitable vehicles such as transparent film forming compositions and oils.

The novel compounds can be combined with solid or liquid pharmaceutical carriers and formulated as tablets, powder packs, or capsules, or dissolved or suspended in suitable solvents for oral or parenteral administration.

The novel compounds of the present invention, with the exception of those compounds containing a hydroxy substituent in the 4-, 5-, 6-, or 7-position are prepared by lithium aluminum hydride reduction of dialkyl skatylmalonates represented by the formula:

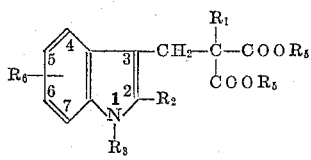

wherein $R_1$, $R_2$, and $R_3$ have the values noted above, $R_5$ represents alkyl containing 1 to 4 carbon atoms, inclusive, and $R_6$ represents hydrogen, benzyloxy, and alkoxy containing 1 to 4 carbon atoms, inclusive. The reduction is advantageously carried out in the presence of an inert solvent such as diethyl ether, tetrahydrofuran, dibutyl ether, and the like, with tetrahydrofuran generally being preferred, at temperatures between about 0° C. and about 100° C., preferably between about 15° C. and about 75° C. In many instances it is very convenient and satisfactory to carry out the reduction at the boiling point of the reaction mixture, e.g., when employing tetrahydrofuran as the inert solvent. After a suitable reaction period, usually from about 30 minutes to 7 hours, the 2-skatyl-1,3-propanediol product can be recovered by conventional techniques, e.g., by hydrolyzing the reaction mixture with aqueous ether followed by dilute alkali, filtering, and concentrating the filtrate.

The novel 4-, 5-, 6-, or 7-hydroxy-substituted compounds can be prepared by hydrogenolysis of the corresponding 4-, 5-, 6-, or 7-benzyloxy-substituted compounds. The hydrogenolysis can be advantageously carried out in the presence of a palladium catalyst such as a palladium black, palladium-barium sulfate, palladium-charcoal, and the like in the manner more fully disclosed in U.S. Patent 2,708,197.

The dialkyl skatylmalonates are advantageously prepared by condensation of a dialkyl malonate and a 3-dialkylaminomethylindole represented by the formula:

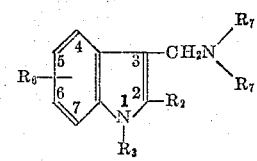

wherein $R_2$, $R_3$, and $R_6$ have the values given above and $R_7$ is alkyl containing 1 to 4 carbon atoms, inclusive. Representative dialkyl malonates which can be employed include dimethyl malonate, diethyl malonate, diisobutyl malonate, diethyl methylmalonate, diethyl ethylmalonate, diethyl propylmalonate, diethyl butylmalonate, dipropyl methylmalonate, dipropylethylmalonate, dipropyl propylmalonate, dibutyl methylmalonate, dibutyl ethylmalonate, dibutyl propylmalonate, dibutyl butylmalonate, and the like. The condensation is advantageously accomplished in the presence of an alkali such as sodium hydroxide, potassium hydroxide, and the like, and in the presence of an inert solvent such as toluene, benzene, xylene, and the like. The reaction is generally conducted at temperatures between about 75° C. and about 150° C.; the boiling point of the reaction mixture is often quite convenient and satisfactory.

The 3-dialkylaminomethylindoles can be prepared by reacting an indole represented by the formula:

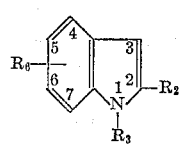

wherein $R_2$, $R_3$, and $R_6$ have the values noted above, with a dialkylamine in the presence of formaldehyde. Preferably the dialkylamine contains from 2 to 8 carbon atoms, inclusive. Representative dialkylamines which can be employed include dimethylamine, diethylamine, diisopropylamine, dibutylamine, ethylmethylamine, ethylisoamylamine, methylheptylamine, and the like. For example, the procedures disclosed by Ek et al. (J. Am. Chem. Soc. 76, 5579, 1954), Rydon et al. (J. Chem. Soc. 2462, 1951), Bell et al. (J. Org. Chem. 13, 547, 1948) and Supniewski et al. (Acta Polon. Pharm. 2, 125, 1938; C.A. 34, 6410, 1940) can be effectively employed.

The starting indoles utilized for the preparation of the 3-dialkylaminomethylindoles can be prepared in the manner more fully disclosed in U.S. Patent 2,825,734. Representative starting indoles which can be employed include indole, 1-methylindole, 1,2-diethylindole, 1-methyl-5-methoxyindole, 5-benzyloxyindole, 5-ethoxyindole, 2-t-butylindole, 6-benzyloxyindole, 1-propyl-6-benzyloxyindole, 1,2-diethyl-5-benzyloxyindole, 1-propyl-5-methoxyindole, 1,2-dipropyl-5-ethoxyindole, 1,2-diethyl-6-benzyloxyindole, 1-propyl-5-propoxyindole, 2-ethyl-6-butoxyindole, 7-ethoxyindole, 1,2-dibutylindole, and the like.

The following examples are illustrative of the process and products of the present invention, but are not to be construed as limiting.

EXAMPLE 1

*Preparation of 2-(2-methylskatyl)-1,3-propanediol)*

A. 2-METHYL-3-DIMETHYLAMINOMETHYLINDOLE

A solution of 92.0 ml. of acetic acid and 22.2 ml. of 40% formaldehyde was cooled to 10° C. and 60.0 ml. of 25% dimethylamine was added. The solution was stirred for about 10 minutes and a solution of 39.0 g. (0.3 mole) of 2-methylindole and 50 ml. of dioxane was added over a 1-hour period. The reaction mixture was allowed to stand for about 16 hours at 25° C. and 600 ml. of water was then added. The mixture was extracted 3 times with 100-ml. portions of ether; the ethereal extracts were discarded. The aqueous layer was made basic with 100 g. of potassium hydroxide and the mixture was refrigerated at about 0° C. The resulting solid was recovered by filtration and recrystallized from a mixture consisting of 200 ml. of benzene and 750 ml. of Skellysolve B (essentially a mixture of hexanes having a boiling range of 140 to 160° F.), to yield 45.0 g. (79.7% of theory) of 2-methyl-3-dimethylaminomethylindole which melted at 122–124° C.

B. DIETHYL (2-METHYLSKATYL)MALONATE

A mixture of 18.8 g. (0.1 mole) of 2-methyl-3-dimethylaminomethylindole, 15.9 g. (0.1 mole) of diethyl malonate, 0.2 g. of sodium hydroxide, and 300 ml. of toluene was refluxed for 16 hours under a stream of nitrogen. The mixture was cooled and extracted with a solution of 15 ml. of concentrated hydrochloric acid and 300 ml. of water, the extract being discarded. The organic layer was washed with water, dried over anhydrous sodium sulfate, and filtered. The filtrate was diluted with 1500 ml. of Skellysolve B. The resulting solid, after being recovered and dried, weighed 18.8 g. (62% of theory) and melted at 90° C. An 11.0 g. sample was recrystallized from a benzene-Skellysolve B mixture and then from an ethanol-water mixture to yield 8.2 g. of diethyl (2-methylskatyl)malonate which melted at 89–91° C.

*Anal.*—Calcd. for $C_{17}H_{21}NO_4$: C, 67.35; H, 6.98; N, 4.61. Found: C, 67.60; H, 6.98; N, 4.81.

C. 2-(2-METHYLSKATYL)-1,3-PROPANEDIOL

A solution of 8.0 g. (0.02 mole) of diethyl (2-methylskatyl)malonate and 60 ml. of tetrahydrofuran was added over a 30-minute period to a mixture of 6.1 g. (0.16 mole) of lithium aluminum hydride and 220 ml. of tetrahydrofuran. The mixture was refluxed for 6 hours and was then allowed to stand for 16 hours at about 25° C. The reaction mixture was treated with 300 ml. of wet ether, followed by 12 ml. of water and 2.4 g. of sodium hydroxide. The mixture was made up to 700 ml. with ether and filtered. The filtrate was dried over anhydrous potassium carbonate, filtered, and the filtrate was concentrated to yield a clear oil. Crystallization from an ethanol-water mixture yielded 3.0 g. (70% of theory) of 2-(2-methylskatyl)-1,3-propanediol which melted at 88–89° C.

*Anal.*—Calcd. for $C_{13}H_{17}NO_2$: C, 71.20; H, 7.81; N, 6.38. Found: C, 70.62; H, 7.64; N, 6.25.

The ultraviolet absorption spectrum of the compound (in ethanol) exhibited maxima at 226, f 276, 282, and 290 millimicrons. The infrared absorption spectrum of the compound (mineral oil mull) exhibited maxima at 3380, 3300, 3220 sh, 1616, 1600, 1585, 1568, 1482 sh, 1307, 1232, 1120, 1070, 1040, 980, 760, and 745 reciprocal centimeters.

EXAMPLE 2

*Preparation of 2-methyl-2-(2-methylskatyl)-1,3-propanediol*

A. DIETHYL METHYL(2-METHYLSKATYL)MALONATE

A mixture of 25.0 g. (0.133 mole) of 2-methyl-3-dimethylaminomethylindole, 21.3 g. (0.131 mole) of diethyl methylmalonate, 0.4 g. of sodium hydroxide, and 300 ml. of toluene was refluxed for 24 hours under a stream of nitrogen. The mixture was cooled and extracted with dilute hydrochloric acid, the extract being discarded. The organic layer was washed with water, dried over anhydrous potassium carbonate, filtered, and concentrated. The resulting oil was crystallized from an ether-Skellysolve B mixture, and then the solid so obtained was recrystallized from a benzene-Skellysolve B mixture, to yield 13.4 g. (32% of theory) of diethyl methyl(2-methylskatyl)malonate which melted at 118–120° C.

*Anal.*—Calcd. for $C_{18}H_{23}NO_4$: C, 68.11; H, 7.30; N, 4.41. Found: C, 68.63; H, 7.42; N, 4.64.

B. 2-METHYL-2-(2-METHYLSKATYL)-1,3-PROPANEDIOL

A solution of 12.0 g. (0.0378 mole) of diethyl methyl (2-methylskatyl)malonate and 100 ml. of tetrahydrofuran was added over a 30-minute period to a mixture of 9.1 g. (0.24 mole) of lithium aluminum hydride and 240 ml. of tetrahydrofuran. The mixture was refluxed for 4 hours, cooled, and decomposed with a mixture of 500 ml. of ether and 18 ml. of water, followed by 10 ml. of saturated aqueous sodium hydroxide solution. The mixture was stirred for about 15 minutes and filtered. The filtrate was dried over anhydrous potassium carbonate and concentrated to yield a colorless oil. The oil solidified after being washed with benzene. After recrystallization of the solid from benzene the product, 2-methyl-2-(2-methylskatyl)-1,3-propanediol, weighed 7.3 g. and melted at 93–95° C.

*Anal.*—Calcd. for $C_{14}H_{19}NO_2$: C, 72.07; H, 8.20; N, 6.05. Found: C, 71.90; H, 7.73; N, 6.07.

The ultraviolet absorption spectrum of the compound (in ethanol) exhibited maxima at 226, f 276, 282, and 290 millimicrons. The infrared absorption spectrum of the compound (mineral oil mull) exhibited maxima at 3380 sh, 3300, 1620, 1600 sh, 1585, 1567, 1493, 1307, 1257 sh, 1250, 1244, 1233, 1220, 1157, 1150 sh, 1130, 1064, 1050 sh, 1043, 1023, 1013, 773, 755, 748, 740 sh, 683, and 677 reciprocal centimeters.

EXAMPLE 3

*Preparation of 2-ethyl-2-(1,2-diethyl-5-benzyloxyskatyl)-1,3-propanediol*

A. 1,2-DIETHYL-5-BENZYLOXY-3-DIMETHYLAMINOMETHYLINDOLE

In the same manner as shown in Example 1, Part A, 1,2-diethyl-5-benzyloxy-3-dimethylaminomethylindole was prepared by using 1,2-diethyl-5-benzyloxyindole (U.S. Patent 2,825,734) instead of 2-methylindole.

B. DIETHYL ETHYL(1,2-DIETHYL-5-BENZYLOXYSKATYL)MALONATE

In the same manner as shown in Example 2, Part A, diethyl ethyl(1,2-diethyl-5-benzyloxyskatyl)malonate was prepared by using 1,2-diethyl-5-benzyloxy-3-dimethylaminomethylindole and diethyl ethylmalonate instead of 2-methyl-3-dimethylaminomethylindole and diethyl methylmalonate.

C. 2-ETHYL-2-(1,2-DIETHYL-5-BENZYLOXYSKATYL)-1,3-PROPANEDIOL

In the same manner as shown in Example 2, Part B, 2-ethyl-2-(1,2-diethyl-5-benzyloxyskatyl)-1,3-propanediol was prepared by reducing diethyl ethyl(1,2-diethyl-5-benzyloxyskatyl)malonate instead of diethyl methyl(2-methylskatyl)malonate.

EXAMPLE 4

*Preparation of 2-propyl-2-(1-propyl-5-methoxyskatyl)-1,3-propanediol*

A. 1-PROPYL-5-METHOXY-3-DIMETHYLAMINOMETHYLINDOLE

In the same manner as shown in Example 1, Part A, 1-propyl-5-methoxy-3-dimethylaminomethylindole was prepared by using 1-propyl-5-methoxyindole instead of 2-methylindole.

B. DIETHYL PROPYL(1-PROPYL-5-METHOXYSKATYL) MALONATE

In the same manner as shown in Example 2, Part A, diethyl propyl(1-propyl-5-methoxyskatyl)malonate was prepared by using 1-propyl-5-methoxy-3-dimethylaminomethylindole and diethyl propylmalonate instead of 2-methyl-3-dimethylaminomethylindole and diethyl methylmalonate.

C. 2-PROPYL-2-(1-PROPYL-5-METHOXYSKATYL)-1,3-PROPANEDIOL

In the same manner as shown in Example 2, Part B, 2-propyl-2-(1-propyl-5-methoxyskatyl)-1,3-propanediol was prepared by reducing diethyl propyl(1-propyl-5-methoxyskatyl)malonate instead of diethyl methyl(2-methylskatyl)malonate.

EXAMPLE 5

*Preparation of 2-butyl-2-(1,2-dipropyl-5-ethoxyskatyl)-1,3-propanediol*

A. 1,2-DIPROPYL-5-ETHOXY-3-DIMETHYLAMINOMETHYLINDOLE

In the same manner as shown in Example 1, Part A, 1,2-dipropyl-5-ethoxy-3-dimethylaminomethylindole was prepared by using 1,2-dipropyl-5-ethoxyindole instead of 2-methylindole.

B. DIETHYL BUTYL(1,2-DIPROPYL-5-ETHOXYSKATYL) MALONATE

In the same manner as shown in Example 2, Part A, diethyl butyl(1,2-dipropyl-5-ethoxyskatyl)malonate was prepared by using 1,2-dipropyl-5-ethoxy-3-dimethylaminomethylindole and diethyl butylmalonate instead of 2-methyl-3-dimethylaminomethylindole and diethyl methylmalonate.

C. 2-BUTYL-2-(1,2-DIPROPYL-5-ETHOXYSKATYL)-1,3-PROPANEDIOL

In the same manner as shown in Example 2, Part B, 2-butyl-2-(1,2-dipropyl-5-ethoxyskatyl)-1,3-propanediol was prepared by reducing diethyl butyl(1,2-dipropyl-5-ethoxyskatyl)malonate instead of diethyl methyl(2-methylskatyl)malonate.

EXAMPLE 6

*2-(1,2-diethyl-6-benzyloxyskatyl)-1,3-propanediol*

A. 1,2-DIETHYL-6-BENZYLOXY-3-DIMETHYLAMINOMETHYLINDOLE

In the same manner as shown in Example 1, Part A, 1,2-diethyl-6-benzyloxy-3-dimethylaminomethylindole was prepared by using 1,2-diethyl-6-benzyloxyindole instead of 2-methylindole.

B. DIETHYL (1,2-DIETHYL-6-BENZYLOXYSKATYL) MALONATE

In the same manner as shown in Example 1, Part B, diethyl (1,2-diethyl-6-benzyloxyskatyl)malonate was prepared by using 1,2-diethyl-6-benzyloxy-3-dimethylaminomethylindole instead of 2-methyl-3-dimethylaminomethylindole.

C. 2-(1,2-DIETHYL-6-BENZYLOXYSKATYL)-1,3-PROPANEDIOL

In the same manner as shown in Example 1, Part C, 2-(1,2-diethyl-6-benzyloxyskatyl)-1,3-propanediol was prepared by reducing diethyl (1,2-diethyl-6-benzyloxyskatyl)malonate instead of diethyl (2-methylskatyl)malonate.

EXAMPLE 7

*Preparation of 2-propyl-2-(1-propyl-5-propoxyskatyl)-1,3-propanediol*

A. 1-PROPYL-5-PROPOXY-3-DIMETHYLAMINOMETHYLINDOLE

In the same manner as shown in Example 1, Part A, 1-propyl-5-propoxy-3-dimethylaminomethylindole was prepared by using 1-propyl-5-propoxyindole instead of 2-methylindole.

B. DIETHYL PROPYL(1-PROPYL-5-PROPOXYSKATYL) MALONATE

In the same manner as shown in Example 2, Part A, diethyl propyl(1-propyl-5-propoxyskatyl)malonate was prepared by using 1-propyl-5-propoxy-3-dimethylaminomethylindole and diethyl propylmalonate instead of 2-methyl-3-dimethylaminomethylindole and diethyl methylmalonate.

C. 2-PROPYL-2-(1-PROPYL-5-PROPOXYSKATYL)-1,3-PROPANEDIOL

In the same manner as shown in Example 2, Part B, 2-propyl-2-(1-propyl-5-propoxyskatyl)-1,3-propanediol was prepared by reducing diethyl propyl(1-propyl-5-propoxyskatyl)malonate instead of diethyl methyl(2-methylskatyl)malonate.

EXAMPLE 8

*Preparation of 2-ethyl-2-(2-ethyl-6-butoxyskatyl)-1,3-propanediol*

A. 2-ETHYL-6-BUTOXY-3-DIMETHYLAMINOMETHYLINDOLE

In the same manner as shown in Example 1, Part A, 2-ethyl-6-butoxy-3-dimethylaminomethylindole was prepared by using 2-ethyl-6-butoxyindole instead of 2-methylindole.

B. DIETHYL ETHYL(2-ETHYL-6-BUTOXYSKATYL) MALONATE

In the same manner as shown in Example 2, Part A, diethyl ethyl(2-ethyl-6-butoxyskatyl)malonate was prepared by using 2-ethyl-6-butoxy-3-dimethylaminomethylindole and diethyl ethylmalonate intead of 2-methyl-3-dimethylaminomethylindole and diethyl methylmalonate.

C. 2-ETHYL-2-(2-ETHYL-6-BUTOXYSKATYL)-1,3-PROPANEDIOL

In the same manner as shown in Example 2, Part C, 2-ethyl-2-(2-ethyl-6-butoxyskatyl)-1,3-propanediol was prepared by reducing diethyl ethyl(2-ethyl-6-butoxyskatyl) malonate instead of diethyl methyl(2-methylskatyl)malonate.

EXAMPLE 9

*Preparation of 2-(1-methylskatyl)-1,3-propanediol*

A. 1-METHYL-3-DIMETHYLAMINOMETHYLINDOLE

In the same manner as shown in Example 1, Part A, 1-methyl-3-dimethylaminomethylindole was prepared by using 1-methylindole instead of 2-methylindole.

B. DIETHYL (1-METHYLSKATYL)MALONATE

In the same manner as shown in Example 1, Part B, diethyl (1-methylskatyl)malonate was prepared by using 1-methyl-3-dimethylaminomethylindole instead of 2-methyl-3-dimethylaminomethylindole.

C. 2-(1-METHYLSKATYL)-1,3-PROPANEDIOL

In the same manner as shown in Example 1, Part C, 2-(1-methylskatyl)-1,3-propanediol was prepared by reducing diethyl (1-methylskatyl)malonate instead of diethyl (2-methylskatyl)malonate.

EXAMPLE 10

*Preparation of 2-(1,2-diethylskatyl)-1,3-propanediol*

A. 1,2-DIETHYL-3-DIMETHYLAMINOMETHYLINDOLE

In the same manner as shown in Example 1, Part A, 1,2-diethyl-3-dimethylaminomethylindole was prepared by using 1,2-diethylindole instead of 2-methylindole.

B. DIETHYL (1,2-DIETHYLSKATYL)MALONATE

In the same manner as shown in Example 1, Part B, diethyl (1,2-diethylskatyl)malonate was prepared by using 1,2-diethyl-3-dimethylaminomethylindole instead of 2-methyl-3-dimethylaminomethylindole.

C. 2-(1,2-DIETHYLSKATYL)-1,3-PROPANEDIOL

In the same manner as shown in Example 1, Part C, 2-(1,2-diethylskatyl)-1,3-propanediol was prepared by reducing diethyl (1,2-diethylskatyl)malonate instead of diethyl (2-methylskatyl)malonate.

EXAMPLE 11

*Preparation of 2-(1-methyl-5-methoxyskatyl)-1,3-propanediol*

A. 1-METHYL-5-METHOXY-3-DIMETHYLAMINOMETHYL-INDOLE

In the same manner as shown in Example 1, Part A, 1-methyl-5-methoxy-3-dimethylaminomethylindole was prepared by using 1-methyl-5-methoxyindole instead of 2-methylindole.

B. DIETHYL (1-METHYL-5-METHOXYSKATYL)MALONATE

In the same manner as shown in Example 1, Part B, diethyl (1-methyl-5-methoxyskatyl)malonate was prepared by using 1-methyl-5-methoxy-3-dimethylaminomethylindole instead of 2-methyl-3-dimethylaminomethylindole.

C. 2-(1-METHYL-5-METHOXYSKATYL)-1,3-PROPANEDIOL

In the same manner as shown in Example 1, Part C, 2-(1-methyl-5-methoxyskatyl)-1,3-propanediol was prepared by reducing diethyl (1-methyl-5-methoxyskatyl)malonate instead of diethyl (2-methylskatyl)malonate.

EXAMPLE 12

*Preparation of 2-(5-benzyloxyskatyl)-1,3-propanediol*

A. 5-BENZYLOXY-3-DIMETHYLAMINOMETHYLINDOLE

In the same manner as shown in Example 1, Part A, 5-benzyloxy-3-dimethylaminomethylindole was prepared by using 5-benzyloxyindole instead of 2-methylindole.

B. DIETHYL (5-BENZYLOXYSKATYL)MALONATE

In the same manner as shown in Example 1, Part B, diethyl (5-benzyloxyskatyl)malonate was prepared by using 5-benzyloxy-3-dimethylaminomethylindole instead of 2-methyl-3-dimethylaminomethylindole.

C. 2-(5-BENZYLOXYSKATYL)-1,3-PROPANEDIOL

In the same manner as shown in Example 1, Part C, 2-(5-benzyloxyskatyl)-1,3-propanediol was prepared by reducing diethyl (5-benzyloxyskatyl)malonate instead of diethyl (2-methylskatyl)malonate.

EXAMPLE 13

*Preparation of 2-(7-ethoxyskatyl)-1,3-propanediol*

A. 7-ETHOXY-3-DIMETHYLAMINOMETHYLINDOLE

In the same manner as shown in Example 1, Part A, 7-ethoxy-3-dimethylaminomethylindole was prepared by using 7-ethoxyindole instead of 2-methylindole.

B. DIETHYL (7-ETHOXYSKATYL)MALONATE

In the same manner as shown in Example 1, Part B, diethyl (7-ethoxyskatyl)malonate was prepared by using 7-ethoxy-3-dimethylaminomethylindole instead of 2-methyl-3-dimethylaminomethylindole.

C. 2-(7-ETHOXYSKATYL)-1,3-PROPANEDIOL

In the same manner as shown in Example 1, Part C, 2-(7-ethoxyskatyl)-1,3-propanediol was prepared by reducing diethyl (7-ethoxyskatyl)malonate instead of diethyl (2-methylskatyl)malonate.

EXAMPLE 14

*2-(2-t-butylskatyl)-1,3-propanediol*

A. 2-t-BUTYL-3-DIMETHYLAMINOMETHYLINDOLE

In the same manner as shown in Example 1, Part A, 2-t-butyl-3-dimethylaminomethylindole was prepared by using 2-t-butylindole instead of 2-methylindole.

B. DIETHYL (2-t-BUTYLSKATYL)MALONATE

In the same manner as shown in Example 1, Part B, diethyl (2-t-butylskatyl)malonate was prepared by using 2-t-butyl-3-dimethylaminomethylindole instead of 2-methyl-3-dimethylaminomethylindole.

C. 2-(2-t-BUTYLSKATYL)-1,3-PROPANEDIOL

In the same manner as shown in Example 1, Part C, 2-(2-t-butylskatyl)-1,3-propanediol was prepared by reducing diethyl (2-t-butylskatyl)malonate instead of diethyl (2-methylskatyl)malonate.

EXAMPLE 15

*Preparation of 2-(1,2-dibutylskatyl)-1,3-propanediol*

A. 1,2-DIBUTYL-3-DIMETHYLAMINOMETHYLINDOLE

In the same manner as shown in Example 1, Part A, 1,2-dibutyl-3-dimethylaminomethylindole was prepared by using 1,2-dibutylindole instead of 2-methylindole.

B. DIETHYL (1,2-DIBUTYLSKATYL)MALONATE

In the same manner as shown in Example 1, Part B, diethyl (1,2-dibutylskatyl)malonate was prepared by using 1,2-dibutyl-3-dimethylaminomethylindole instead of 2-methyl-3-dimethylaminomethylindole.

C. 2-(1,2-DIBUTYLSKATYL)-1,3-PROPANEDIOL

In the same manner as shown in Example 1, Part C, 2-(1,2-dibutylskatyl)-1,3-propanediol was prepared by reducing diethyl (1,2-dibutylskatyl)malonate instead of diethyl (2-methylskatyl)malonate.

EXAMPLE 16

*2-(5-hydroxyskatyl)-1,3-propanediol*

A mixture of 2-(5-benzyloxyskatyl)-1,3-propanediol (Example 12), absolute methanol, and palladium-on-charcoal catalyst was shaken under fifty pounds hydrogen pressure and when sufficient hydrogen was absorbed the mixture was filtered. The filtrate was concentrated to dryness under reduced pressure to produce 2-(5-hydroxyskatyl)-1,3-propanediol.

EXAMPLE 17

*2-ethyl-2-(1,2-diethyl-5-hydroxyskatyl)-1,3-propanediol*

In the same manner as shown in Example 16, 2-ethyl-2-(1,2-diethyl-5-hydroxyskatyl)-1,3-propanediol was prepared by using 2-ethyl-2-(1,2-diethyl-5-benzyloxyskatyl)-1,3-propanediol (Example 3) instead of 2-(5-benzyloxyskatyl)-1,3-propanediol.

EXAMPLE 18

*Preparation of 2-skatyl-1,3-propanediol*

A. DIETHYL SKATYLMALONATE

In the same manner as shown in Example 1, Part B, diethyl skatylmalonate was prepared by using 3-dimethylaminomethylindole (gramine) instead of 2-methyl-3-dimethylaminomethylindole.

B. 2-SKATYL-1,3-PROPANEDIOL

In the same manner as shown in Example 1, Part C, 2-skatyl-1,3-propanediol was prepared by reducing diethyl skatylmalonate instead of diethyl (2-methylskatyl)malonate.

We claim:
1. 2-skatyl-1,3-propanediols represented by the formula:

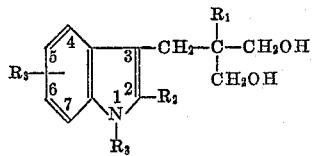

wherein $R_1$, $R_2$, and $R_3$ are selected from the group consisting of hydrogen and alkyl of 1 to 4 carbon atoms, inclusive, and $R_4$ is selected from the group consisting of hydrogen, benzyloxy, hydroxy, and alkoxy of 1 to 4 carbon atoms, inclusive.

2. 2-skatyl-1,3-propanediols represented by the formula:

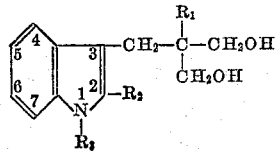

wherein $R_1$, $R_2$, and $R_3$ are alkyl of 1 to 4 carbon atoms, inclusive.

3. 2-skatyl-1,3-propanediols represented by the formula:

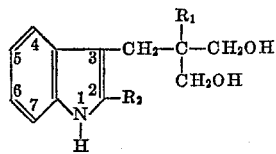

wherein $R_1$ and $R_2$ are alkyl of 1 to 4 carbon atoms, inclusive.

4. 2-skatyl-1,3-propanediols represented by the formula:

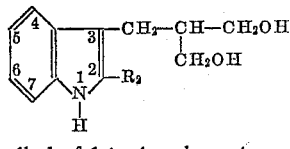

wherein $R_2$ is alkyl of 1 to 4 carbon atoms, inclusive.

5. 2-skatyl-1,3-propanediols represented by the formula:

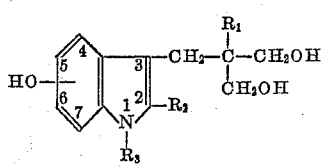

wherein $R_1$, $R_2$, and $R_3$ are alkyl of 1 to 4 carbon atoms, inclusive.

6. 2-skatyl-1,3-propanediols represented by the formula:

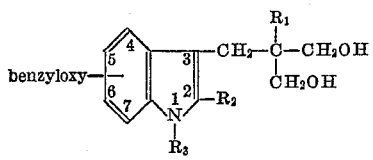

wherein $R_1$, $R_2$, and $R_3$ are alkyl of 1 to 4 carbon atoms, inclusive.

7. 2-skatyl-1,3-propanediols represented by the formula:

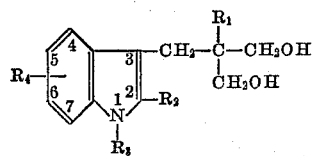

wherein $R_1$, $R_2$, and $R_3$ are alkyl of 1 to 4 carbon atoms, inclusive, and $R_4$ is alkoxy containing 1 to 4 carbon atoms, inclusive.

8. 2-methyl-2-(2-methylskatyl)-1,3-propanediol.
9. 2-(2-methylskatyl)-1,3-propanediol.

References Cited in the file of this patent
Brown et al.: J. Chem. Soc., pages 3172–3176 (1952).